US012300153B2

(12) United States Patent
Park et al.

(10) Patent No.: US 12,300,153 B2
(45) Date of Patent: May 13, 2025

(54) DISPLAY DEVICE AND DRIVING METHOD THEREOF

(71) Applicant: Samsung Display Co., Ltd., Yongin-si (KR)

(72) Inventors: Sehyuk Park, Yongin-si (KR); Donggyu Lee, Yongin-si (KR); Jae-Hyeon Jeon, Yongin-si (KR); Jin-Wook Yang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/120,627

(22) Filed: Mar. 13, 2023

(65) Prior Publication Data

US 2023/0410723 A1 Dec. 21, 2023

(30) Foreign Application Priority Data

Jun. 16, 2022 (KR) ........................ 10-2022-0073691

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01);
(Continued)

(58) Field of Classification Search
CPC ............. G09G 3/32; G09G 2300/0819; G09G 2300/0852; G09G 2300/0861; G09G 2310/08; G09G 2320/0233; G09G 2320/0626; G09G 2340/0435; G09G 2360/16; G09G 3/3233; G09G 5/10;
(Continued)

(56) References Cited

U.S. PATENT DOCUMENTS 10,376,786 B2 8/2019 Lee et al.
10,565,953 B2 2/2020 Kim et al.
(Continued)

FOREIGN PATENT DOCUMENTS

KR 1020170076478 A 7/2017
KR 1020180049332 A 5/2018
KR 1020200075945 A 6/2020

*Primary Examiner* — Patrick N Edouard
*Assistant Examiner* — Joseph P Fox
(74) *Attorney, Agent, or Firm* — CANTOR COLBURN LLP

(57) ABSTRACT

A display device includes a display panel including a pixel which receives a luminance control voltage, a driving controller which receives an input image signal and a control signal and provides an output image signal to the display panel, and a voltage generator which generates the luminance control voltage in response to a voltage control signal from the driving controller. The driving controller determines a current operating frequency based on the control signal, and outputs the voltage control signal based on a difference value between the current operating frequency and a previous operating frequency and an operating time of the previous operating frequency when the current operating frequency is different from the previous operating frequency, where the luminance control voltage is changed from a first voltage level to a second voltage level based on the voltage control signal.

25 Claims, 14 Drawing Sheets

(52) U.S. Cl.
CPC ............... *G09G 2320/0626* (2013.01); *G09G 2340/0435* (2013.01); *G09G 2360/16* (2013.01)

(58) Field of Classification Search
CPC ..... G09G 2300/043; G09G 2300/0809; G09G 2310/0264
See application file for complete search history.

(56) References Cited

U.S. PATENT DOCUMENTS

| | | | | |
|---|---|---|---|---|
| 2016/0092010 | A1* | 3/2016 | Agarwal | G06F 3/0412<br>345/173 |
| 2017/0186375 | A1* | 6/2017 | Jung | G09G 3/3233 |
| 2018/0122327 | A1* | 5/2018 | Kim | G09G 3/3688 |
| 2020/0193915 | A1* | 6/2020 | Noh | G09G 3/3266 |

* cited by examiner

FIG. 7

| DIF | C1 | C2 |
| --- | --- | --- |
| 1000 | 2V | 20H |
| 950 | 1.9V | 19H |
| ⋮ | ⋮ | ⋮ |
| 500 | 1V | 10H |
| 450 | 0.9V | 9H |
| ⋮ | ⋮ | ⋮ |
| 100 | 0.1V | 1H |

DISPLAY DEVICE AND DRIVING METHOD THEREOF

This application claims priority to Korean Patent Application No. 10-2022-0073691, filed on Jun. 16, 2022, and all the benefits accruing therefrom under 35 U.S.C. § 119, the content of which in its entirety is herein incorporated by reference.

BACKGROUND

1. Field

Embodiments of the disclosure described herein relate to a display device.

2. Description of the Related Art

Electronic devices, which provide images to users, such as a smart phone, a digital camera, a notebook computer, a navigation system, a monitor, and a smart television include a display device for displaying the images. The display device generates an image and provides the users with the generated image through a display screen.

The display device typically includes a plurality of pixels and driving circuits (e.g., a scan driving circuit, a data driving circuit, and an emission driving circuit) for controlling the plurality of pixels. Each of the plurality of pixels may include a display element and a pixel circuit for controlling the display element. The driving circuit of a pixel may include a plurality of transistors operatively connected to one another.

Recently, a display device capable of operating at various operating frequencies is developed to improve image quality.

SUMMARY

Embodiments of the disclosure provide a display device capable of operating at various operating frequencies and a driving method thereof.

According to an embodiment, a display device includes a display panel including a pixel which receives a luminance control voltage, a driving controller which receives an input image signal and a control signal and provides an output image signal to the display panel, and a voltage generator which generates the luminance control voltage in response to a voltage control signal from the driving controller. In such an embodiment, the driving controller determines a current operating frequency based on the control signal, and outputs the voltage control signal based on a difference value between the current operating frequency and a previous operating frequency and an operating time of the previous operating frequency when the current operating frequency is different from the previous operating frequency, where the luminance control voltage is changed from a first voltage level to a second voltage level based on the voltage control signal.

In an embodiment, the driving controller may include a luminance compensator which outputs a voltage compensation signal based on the difference value between the current operating frequency and the previous operating frequency and the operating time of the previous operating frequency when the current operating frequency is different from the previous operating frequency, and a control signal generator which receives the voltage compensation signal from the luminance compensator and outputs the voltage control signal in response to the control signal and the voltage compensation signal.

In an embodiment, the luminance compensator may include a frequency determiner which determines the current operating frequency based on the control signal and outputs the current operating frequency, the previous operating frequency, and the operating time when the current operating frequency is different from the previous operating frequency, a luminance deviation determiner which calculates a luminance deviation based on the current operating frequency, the previous operating frequency, and the operating time and outputs the luminance deviation when the luminance deviation is greater than a reference value, and a compensator which receives the luminance deviation from the luminance deviation determiner, calculates a first compensation value corresponding to the luminance deviation and outputs the voltage compensation signal corresponding to the first compensation value.

In an embodiment, when the current operating frequency is lower than the previous operating frequency, the frequency determiner may output the current operating frequency, the previous operating frequency, and the operating time.

In an embodiment, the luminance deviation may be calculated by an arithmetic operation of the difference value between the current operating frequency and the previous operating frequency and the operating time.

In an embodiment, the frequency determiner may accumulate a time during which the current operating frequency is identical to the previous operating frequency, and may output the accumulated time as the operating time when the current operating frequency is different from the previous operating frequency.

In an embodiment, when the current operating frequency is lower than the previous operating frequency, the second voltage level of the luminance control voltage may be lower than the first voltage level.

In an embodiment, the display device may further include a data driver which provides the pixel with a data signal corresponding to the output image signal. The pixel may include a light emitting element including an anode and a pixel circuit electrically connected to the anode of the light emitting element. The pixel circuit may deliver one of a driving current corresponding to the data signal and the luminance control voltage to the anode of the light emitting element.

In an embodiment, the pixel circuit may include a first transistor including a first electrode connected to a first driving voltage line and a second electrode and a second transistor which electrically connects the second electrode of the first transistor to the anode of the light emitting element in response to an emission signal.

In an embodiment, the display device may further include an emission driving circuit which outputs the emission signal in response to an emission control signal from the driving controller. In such an embodiment, when the current operating frequency is different from the previous operating frequency, the driving controller may output the emission control signal based on the difference value between the current operating frequency and the previous operating frequency and the operating time, where an emission period of the emission signal may be changed from a first time to a second time based on the emission control signal.

In an embodiment, when the current operating frequency is lower than the previous operating frequency, the second time may be shorter than the first time.

According to an embodiment, a display device includes a display panel including a pixel which operates in response to an emission signal, a driving controller which receives an input image signal and a control signal and provides an output image signal to the display panel, and an emission driving circuit which outputs the emission signal in response to an emission control signal from the driving controller. In such an embodiment, the driving controller determines a current operating frequency based on the control signal, and outputs the emission control signal based on a difference value between the current operating frequency and a previous operating frequency and an operating time of the previous operating frequency when the current operating frequency is different from the previous operating frequency, where an emission period of the emission signal is changed from a first time to a second time based on the emission control signal.

In an embodiment, the driving controller may include a luminance compensator which outputs an emission compensation signal based on the difference value between the current operating frequency and the previous operating frequency and the operating time of the previous operating frequency when the current operating frequency is different from the previous operating frequency, and a control signal generator which receives the emission compensation signal from the luminance compensator and outputs the emission control signal in response to the control signal and the emission compensation signal.

In an embodiment, the luminance compensator may include a frequency determiner which determines the current operating frequency based on the control signal and outputs the current operating frequency, the previous operating frequency, and the operating time when the current operating frequency is different from the previous operating frequency, a luminance deviation determiner which calculates a luminance deviation based on the current operating frequency, the previous operating frequency, and the operating time and outputs the luminance deviation when the luminance deviation is greater than a reference value, and a compensator which receives the luminance deviation from the luminance deviation determiner, calculates a first compensation value corresponding to the luminance deviation and outputs the emission compensation signal corresponding to the first compensation value.

In an embodiment, when the current operating frequency is lower than the previous operating frequency, the frequency determiner may output the current operating frequency, the previous operating frequency, and the operating time.

In an embodiment, the frequency determiner may accumulate a time during which the current operating frequency is identical to the previous operating frequency, and may output the accumulated time as the operating time when the current operating frequency is different from the previous operating frequency.

In an embodiment, when the current operating frequency is lower than the previous operating frequency, the second time of the emission period is shorter than the first time.

In an embodiment, the display device may further include a data driver which provides the pixel with a data signal corresponding to the output image signal. In such an embodiment, the pixel may include a light emitting element including an anode, a first transistor including a first electrode connected to a first driving voltage line and a second electrode, and a second transistor which electrically connects the second electrode of the first transistor to the anode of the light emitting element during the emission period of the emission signal.

In an embodiment, the display device may further include a voltage generator which provides a luminance control voltage to the pixel in response to a voltage control signal. In such an embodiment, the emission signal may include the emission period and a non-emission period. In such an embodiment, the pixel may further include a third transistor which provides the luminance control voltage to the anode of the light emitting element during an initialization period of the non-emission period.

In an embodiment, when the current operating frequency is different from the previous operating frequency, the driving controller may output the voltage control signal based on the difference value between the current operating frequency and the previous operating frequency and the operating time, where the luminance control voltage may be changed from a first voltage level to a second voltage level based on the voltage control signal.

According to an embodiment, a driving method of a display device includes determining a current operating frequency based on a control signal and determining whether the current operating frequency is different from a previous operating frequency, changing a voltage level of a luminance control voltage from a first voltage level to a second voltage level based on a difference value between the current operating frequency and the previous operating frequency and an operating time of the previous operating frequency when the current operating frequency is different from the previous operating frequency, and providing the luminance control voltage to a pixel.

In an embodiment, the changing the voltage level of the luminance control voltage from the first voltage level to the second voltage level may include calculating a luminance deviation based on the difference value between the current operating frequency and the previous operating frequency and the operating time of the previous operating frequency, calculating a first compensation value when the luminance deviation is greater than a reference value, outputting a voltage compensation signal corresponding to the first compensation value, and generating the luminance control voltage in response to the voltage compensation signal.

In an embodiment, the driving method of the display device may further include outputting an emission control signal based on the difference value and the operating time when the current operating frequency is different from the previous operating frequency, where an emission period of an emission signal may be changed from a first time to a second time. In such an embodiment, the pixel may operate in response to the emission control signal.

In an embodiment, the outputting the emission control signal may include calculating a luminance deviation based on the difference value and the operating time, calculating a second compensation value when the luminance deviation is greater than a reference value, outputting an emission compensation signal corresponding to the second compensation value, and outputting the emission control signal in response to the emission compensation signal.

According to an embodiment, a driving controller includes a luminance compensator which determines a current operating frequency based on a control signal provided from an outside and outputs a voltage compensation signal based on a difference value between the current operating frequency and a previous operating frequency and an operating time of the previous operating frequency when the current operating frequency is different from the previous operating frequency, and a control signal generator which receives the voltages compensation signal from the luminance compensator and outputs a voltage control signal in response to the control signal and the voltage compensation signal, where a voltage level of a luminance control voltage is changed based on the voltage control signal.

In an embodiment, the luminance compensator may include a frequency determiner which determines the current operating frequency based on the control signal and outputs the current operating frequency, the previous operating frequency, and the operating time of the previous operating frequency when the current operating frequency is different from the previous operating frequency, a luminance deviation determiner which calculates a luminance deviation based on the current operating frequency, the previous operating frequency, and the operating time and outputs the luminance deviation when the luminance deviation is greater than a reference value, and a compensator which receives the luminance deviation from the luminance deviation determiner, calculates a first compensation value corresponding to the luminance deviation and outputs the voltage compensation signal corresponding to the first compensation value.

In an embodiment, the frequency determiner may accumulate a time during which the current operating frequency is identical to the previous operating frequency, and may output an accumulated time as the operating time when the current operating frequency is different from the previous operating frequency.

In an embodiment, when the current operating frequency is different from the previous operating frequency, the compensator may output an emission compensation signal based on the difference value between the current operating frequency and the previous operating frequency and the operating time. In such an embodiment, the control signal generator may further output an emission control signal in response to the emission compensation signal, and an emission period of an emission signal may be changed from a first time to a second time based on the emission control signal.

BRIEF DESCRIPTION OF THE DRAWINGS

The above and other features of embodiments of the disclosure will become apparent by describing in detail embodiments thereof with reference to the accompanying drawings.

FIG. 7 is a diagram illustrating a first compensation value and a second compensation value stored in a lookup table shown in FIG. 6.

DETAILED DESCRIPTION

Figure 1:
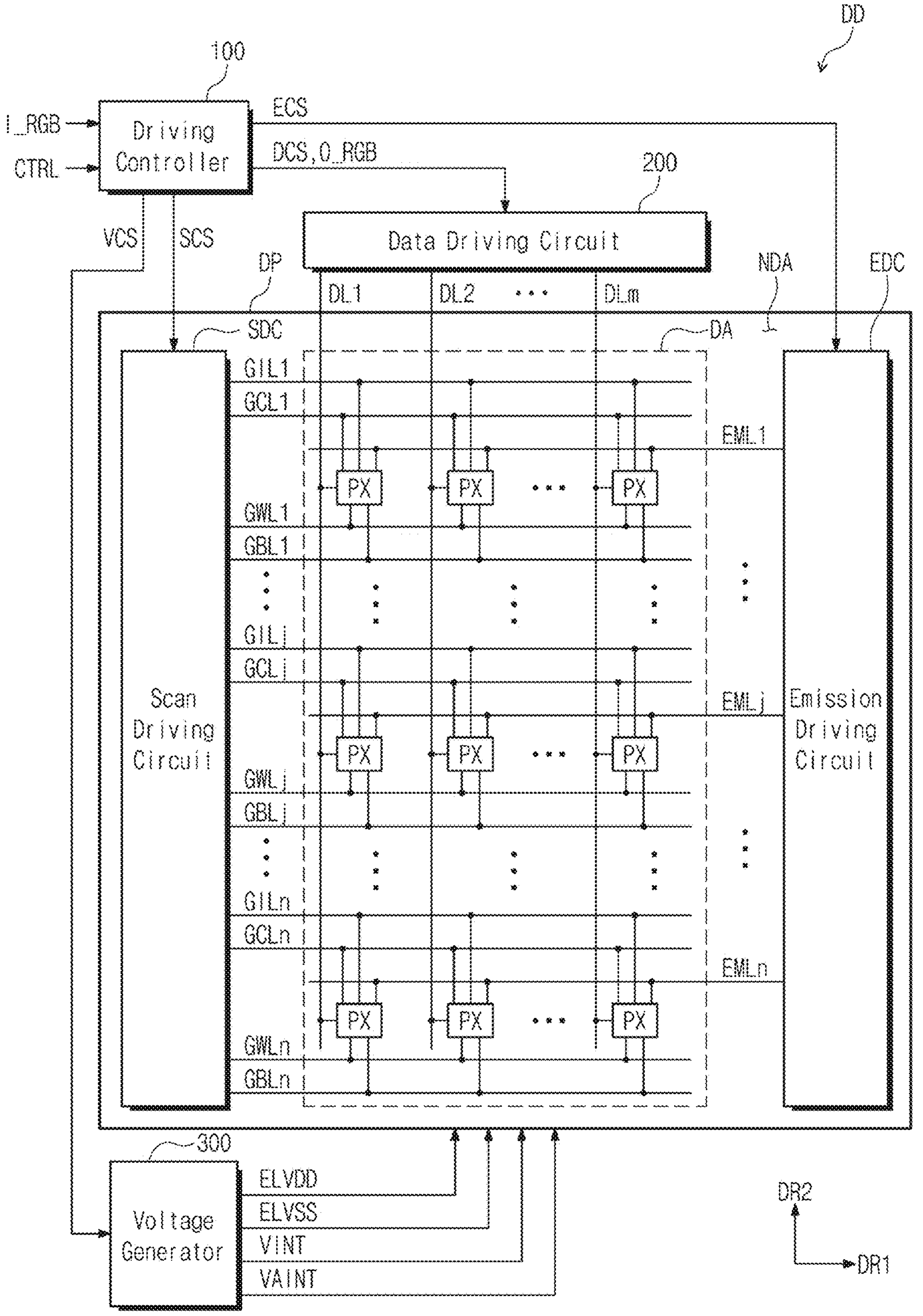
FIG. 1 is a block diagram of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, etc.) is "on", "connected to", or "coupled to" a second component means that the first component is directly on, connected to, or coupled to the second component or means that a third component is interposed therebetween.

Like reference numerals refer to like components. Also, in drawings, the thickness, ratio, and dimension of components are exaggerated for effectiveness of description of technical contents.

The terms "first", "second", etc. are used to describe various components, but the components are not limited by the terms. The terms are used only to differentiate one component from another component. For example, without departing from the scope and spirit of the disclosure, a first component may be referred to as a second component, and similarly, the second component may be referred to as the first component.

Also, the terms "under", "beneath", "on", "above", etc. are used to describe a relationship between components illustrated in a drawing. The terms are relative and are described with reference to a direction indicated in the drawing.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

FIG. 1 is a block diagram of a display device, according to an embodiment of the disclosure.

Referring to FIG. 1, an embodiment of a display device DD includes a display panel DP, a driving controller 100, a data driving circuit 200, and a voltage generator 300.

The driving controller 100 receives an input image signal I_RGB and a control signal CTRL from an outside. The driving controller 100 generates an output image signal O_RGB obtained by converting a data format of the input image signal I_RGB to fit (or to match the specification of) the display panel DP. The driving controller 100 outputs a scan control signal SCS, a data control signal DCS, an emission control signal ECS, and a voltage control signal VCS.

The data driving circuit 200 receives the data control signal DCS and the output image signal O_RGB from the driving controller 100. The data driving circuit 200 converts the output image signal O_RGB into data signals and outputs the data signals to a plurality of data lines DL1 to DLm to be described later. Here, m is a natural number. The data signals refer to analog voltages corresponding to a grayscale level of the output image signal O_RGB.

The voltage generator 300 generates voltages used to operate the display panel DP. In an embodiment, the voltage generator 300 generates a first driving voltage ELVDD, a second driving voltage ELVSS, a first initialization voltage VAINT, and a second initialization voltage VINT.

The display panel DP includes scan lines GIL1 to GILn, GCL1 to GCLn, and GWL1 to GWLn, and GBL1 to GBLn, emission lines EML1 to EMLn, the data lines DL1 to DLm, and pixels PX. Here, n is a natural number. The display panel DP may further include a scan driving circuit SDC and an emission driving circuit EDC.

In an embodiment, the pixels PX may be positioned in a display area DA. The scan driving circuit SDC and the emission driving circuit EDC may be positioned in a non-display area NDA.

In an embodiment, the scan driving circuit SDC is arranged on a first side of the non-display area NDA of the display panel DP. The scan lines GIL1 to GILn, GCL1 to GCLn, GWL1 to GWLn, and GBL1 to GBLn extend from the scan driving circuit SDC in a first direction DR1.

The emission driving circuit EDC is arranged on a second side of the non-display area NDA of the display panel DP. The emission lines EML1 to EMLn extend from the emission driving circuit EDC in a direction opposite to the first direction DR1.

The scan lines GIL1 to GILn, GCL1 to GCLn, GWL1 to GWLn, and GBL1 to GBLn and the emission lines EML1 to EMLn are arranged spaced from one another in a second direction DR2. The data lines DL1 to DLm extend from the data driving circuit 200 in a direction opposite to the second direction DR2, and are arranged spaced from one another in the first direction DR1.

In an embodiment, as shown in FIG. 1, the scan driving circuit SDC and the emission driving circuit EDC are arranged to face each other with the pixels PX interposed therebetween, but the disclosure is not limited thereto. In an alternative embodiment, for example, the scan driving circuit SDC and the emission driving circuit EDC may be positioned adjacent to each other on one of the first side and the second side of the display panel DP. In another alternative embodiment, the scan driving circuit SDC and the emission driving circuit EDC may be implemented with one circuit or a single chip.

Each of the plurality of pixels PX may be electrically connected to four scan lines and one emission line. In an embodiment, for example, as shown in FIG. 1, a first row of pixels PX may be connected to the scan lines GILL GCL1, GWL1, and GBL1 and the emission line EML1. Furthermore, a j-th row of pixels may be connected to the scan lines GILj, GCLj, GWLj, and GBLj and the emission line EMLj. Here, j is a natural number less than or equal to n.

Each of the plurality of pixels PX includes a light emitting element ED (see FIG. 2) and a pixel circuit PXC (see FIG. 2) for controlling the emission of the light emitting element ED. The pixel circuit PXC may include one or more transistors and one or more capacitors. The scan driving circuit SDC and the emission driving circuit EDC may include transistors formed through a same process as the pixel circuit PXC.

Each of the plurality of pixels PX receives the first driving voltage ELVDD, the second driving voltage ELVSS, the first initialization voltage VAINT, and the second initialization voltage VINT from the voltage generator 300.

The scan driving circuit SDC receives the scan control signal SCS from the driving controller 100. The scan driving circuit SDC may output scan signals to the scan lines GIL1 to GILn, GCL1 to GCLn, GWL1 to GWLn, and GBL1 to GBLn in response to the scan control signal SCS.

The emission driving circuit EDC receives the emission control signal ECS from the driving controller 100. The emission driving circuit EDC may output emission signals to the emission lines EML1 to EMLn in response to the emission control signal ECS.

According to an embodiment of the disclosure, the driving controller 100 may determine a current operating frequency of the input image signal I_RGB based on the control signal CTRL, and may change an operating environment of the display device DD based on a difference value of the current operating frequency and a previous operating frequency and the operating time of the previous operating frequency.

Changing an operating environment of the display device DD may include an environment for controlling the amount of light of the light emitting device ED in the pixel PX (e.g., a change in a voltage level of the first initialization voltage VAINT or a change in a pulse width of emission signals EM1 to EMn, or the like).

Figure 2:
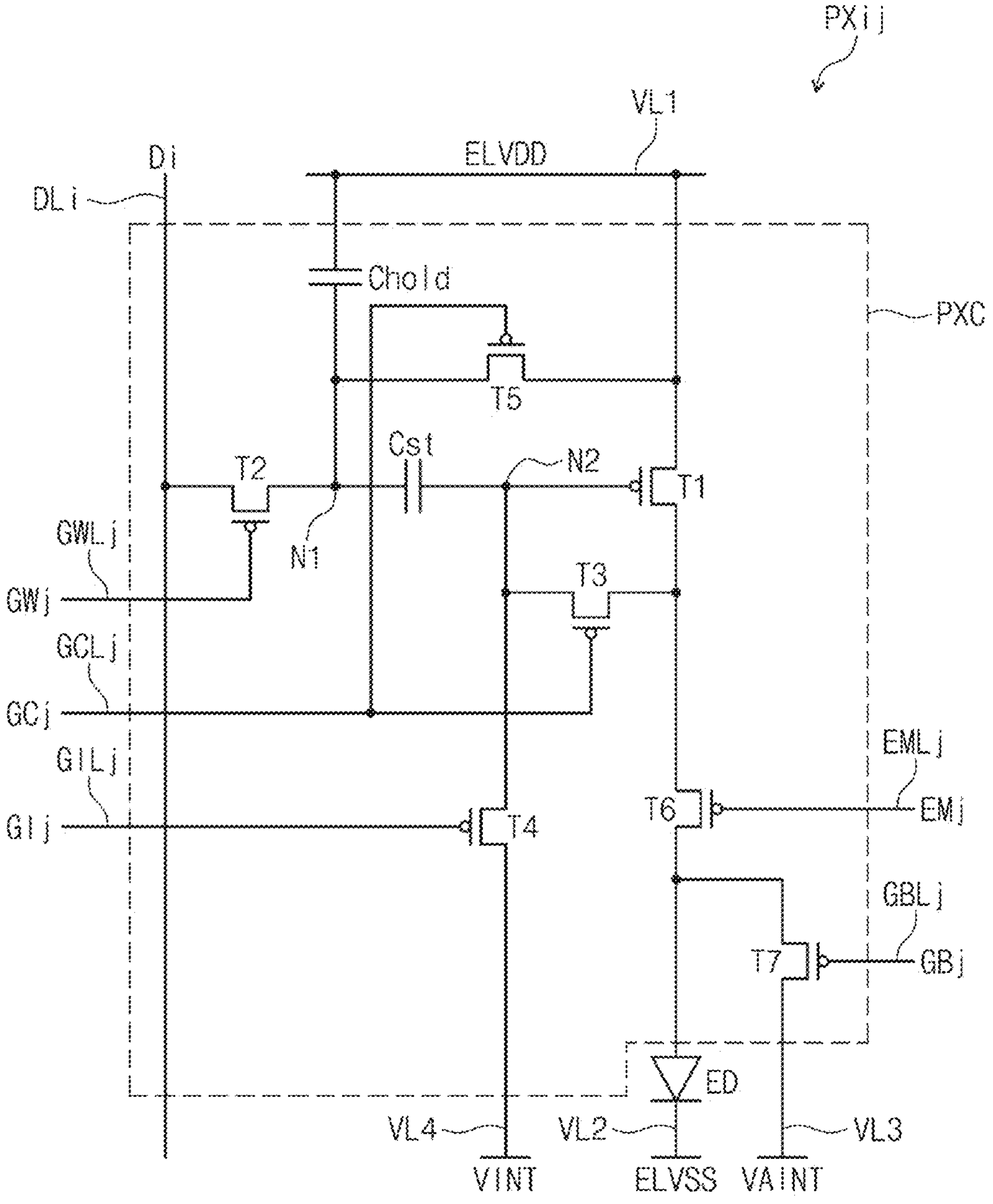
FIG. 2 is a circuit diagram of a pixel according to an embodiment of the disclosure.

FIG. 2 is a circuit diagram of a pixel, according to an embodiment of the disclosure.

FIG. 2 illustrates an embodiment of a pixel PXij connected to an i-th data line DLi among the data lines DL1 to DLm, the j-th scan lines GILj, GCLj, GWLj, and GBLj among the scan lines GIL1 to GILn, GCL1 to GCLn, GWL1 to GWLn, and GBL1 to GBLn and the j-th emission line EMLj among the emission lines EML1 to EMLn, which are illustrated in FIG. 1. Here, i is a natural number less than or equal to m.

Each of the plurality of pixels PX shown in FIG. 1 may have a same circuit configuration as the pixel PXij shown in FIG. 2.

Referring to FIG. 2, the pixel PXij according to an embodiment includes a pixel circuit PXC and at least one light emitting element ED. The pixel circuit PXC includes first to seventh transistors T1, T2, T3, T4, T5, T6, and T7 and a first capacitor Chold and a second capacitor Cst. The light emitting element ED may be a light emitting diode. In an embodiment, each pixel PXij may include a single light emitting element ED.

In an embodiment, each of the first to seventh transistors T1 to T7 is a P-type transistor having a low-temperature polycrystalline silicon (LTPS) semiconductor layer. However, the disclosure is not limited thereto. I n an embodiment, the first to seventh transistors T1 to T7 may be N-type transistors by using an oxide semiconductor as a semiconductor layer. In an embodiment, at least one of the first to seventh transistors T1 to T7 may be an N-type transistor, and the other(s) thereof may be P-type transistors. Moreover, the circuit configuration of a pixel according to an embodiment of the disclosure is not limited to FIG. 2. The pixel circuit PXC illustrated in FIG. 2 is only an example. In an embodiment, for example, the configuration of the pixel circuit PXC may be modified and implemented.

The scan lines GILj, GCLj, GWLj, and GBLj may deliver scan signals GIj, GCj, GWj, and GBj, respectively. The emission line EMLj may deliver an emission signal EMj. The data line DLi transfers a data signal Di. The data signal Di may have a voltage level corresponding to the output image signal O_RGB output from the driving controller 100 (see FIG. 1). First to fourth driving voltage lines VL1, VL2, VL3, and VL4 may transfer the first driving voltage ELVDD, the second driving voltage ELVSS, the first initialization voltage VAINT, and the second initialization voltage VINT, respectively.

The first capacitor Chold is connected between the first driving voltage line VL1 and a first node N1. The second capacitor Cst is connected between the first node N1 and a second node N2.

The first transistor T1 includes a first electrode connected to the first driving voltage line VL1, a second electrode electrically connected to an anode of the light emitting element ED via the sixth transistor T6, and a gate electrode electrically connected to the second node N2.

The second transistor T2 includes a first electrode connected to the data line DLi, a second electrode connected to the first node N1, and a gate electrode connected to the scan line GWLj. The second transistor T2 may be turned on in response to the scan signal GWj received through the scan line GWLj and then may deliver the data signal Di delivered from the data line DLi to the first node N1.

The third transistor T3 includes a first electrode connected to the second electrode of the first transistor T1, a second electrode connected to the second node N2, that is, the gate electrode of the first transistor T1, and a gate electrode connected to the scan line GCLj. The third transistor T3 may be turned on in response to the scan signal GCj received through the scan line GCLj to electrically connect the gate electrode of the first transistor T1 and the second electrode of the first transistor T1 to each other.

The fourth transistor T4 includes a first electrode connected to the second node N2, a second electrode connected to the fourth driving voltage line VL4, and a gate electrode connected to the scan line GILj. The fourth transistor T4 may be turned on in response to the scan signal GIj transferred through the scan line GILj such that the second initialization voltage VINT is transferred to the gate electrode of the first transistor T1. As such, a voltage of the gate electrode of the first transistor T1 may be initialized.

The fifth transistor T5 includes a first electrode connected to the first node N1, a second electrode connected to the first electrode of the first transistor T1, and a gate electrode connected to the scan line GCLj. The fifth transistor T5 may be turned on in response to the scan signal GCj received through the scan line GCLj to electrically connect the first node N1 and the first electrode of the first transistor T1 to each other.

The sixth transistor T6 includes a first electrode connected to the second electrode of the first transistor T1, a second electrode connected to the anode of the light emitting element ED, and a gate electrode connected to the emission line EMLj.

The sixth transistor T6 may be turned on in response to the emission signal EMj received through the emission line EMLj. As the sixth transistor T6 is turned on, a current path may be formed between the first driving voltage line VL1 and the light emitting element ED through the first transistor T1 and the sixth transistor T6. That is, the sixth transistor T6 may electrically connect the second electrode of the first transistor T1 to the light emitting element ED in response to the emission signal EMj.

The seventh transistor T7 includes a first electrode connected to the anode of the light emitting element ED, a second electrode connected to the third driving voltage line VL3, and a gate electrode connected to the scan line GBLj. The seventh transistor T7 may be turned on in response to the scan signal GBj received through the scan line GBLj to electrically connect the anode of the light emitting element ED to the third driving voltage line VL3 to each other.

The light emitting element ED includes the anode connected to the second electrode of the sixth transistor T6 and a cathode connected to the second driving voltage line VL2.

Figure 3:
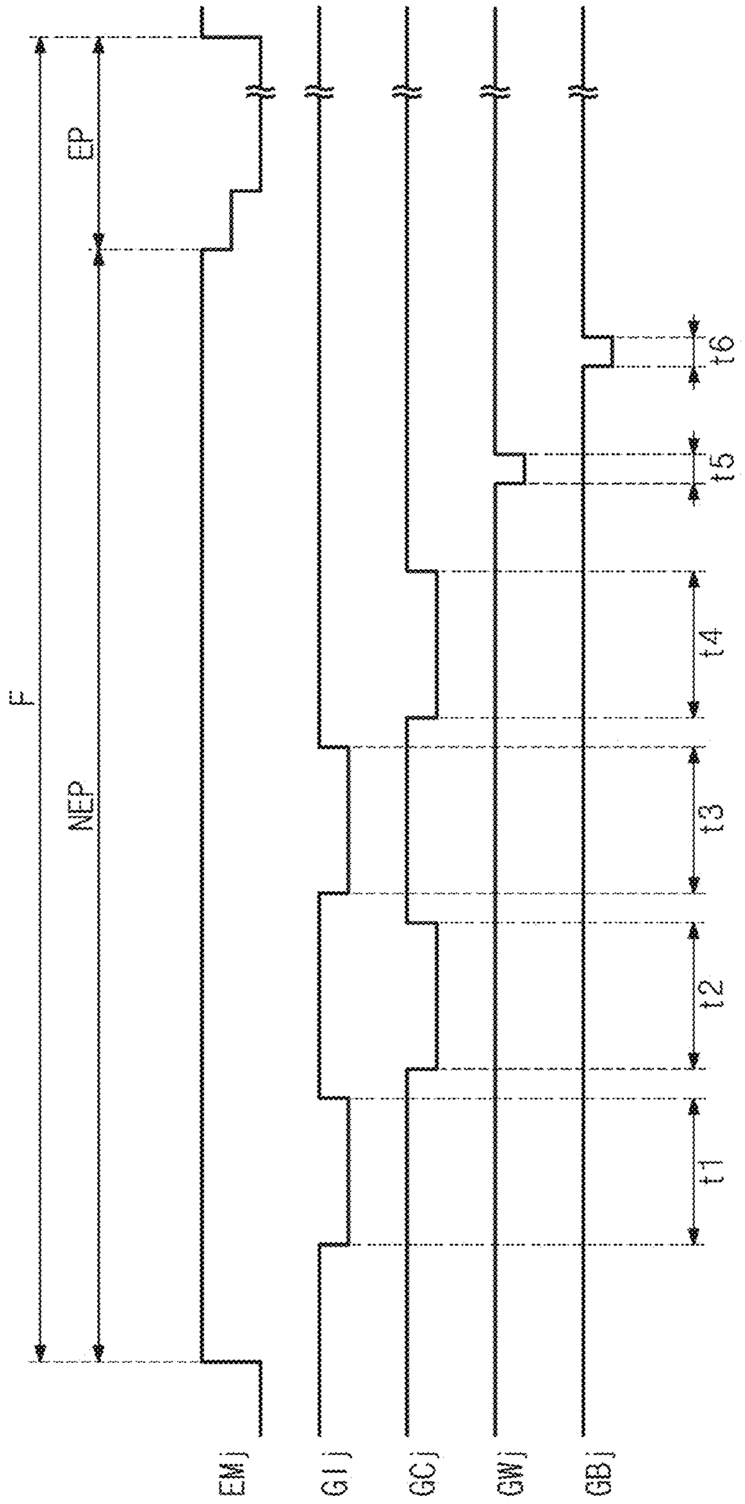
FIG. 3 is a signal timing diagram for describing an operation of a pixel illustrated in FIG. 2.

FIG. 3 is a signal timing diagram for describing an operation of a pixel illustrated in FIG. 2. Hereinafter, an operation of a display device according to an embodiment will be described with reference to FIGS. 2 and 3.

Referring to FIGS. 2 and 3, one frame F may include an emission period EP and a non-emission period NEP in which the light emitting element ED does not emit light. The non-emission period NEP includes first to sixth periods t1 to t6.

During the first period t1, the scan signal GIj having a low level is provided through the scan line GILj. When the fourth transistor T4 is turned on in response to the scan signal GIj having the low level, the second initialization voltage VINT is supplied to the gate electrode of the first transistor T1 through the fourth transistor T4 to initialize the first transistor T1. The first period t1 may be an initialization period for initializing a voltage level of the gate electrode of the first transistor T1.

Next, when the scan signal GCj having a low level is supplied through the scan line GCLj during the second period t2, the fifth transistor T5 is turned on. The first node N1 may be initialized to the first driving voltage ELVDD by the fifth transistor T5 thus turned on.

During the second period t2, the third transistor T3 is turned on by the scan signal GCj having a low level. The first transistor T1 is diode-connected by the third transistor T3 turned on and is forward-biased. Accordingly, the potential of the second node N2 may be set to a difference (ELVDD−Vth) between the first driving voltage ELVDD and a threshold voltage (referred to as "Vth") of the first transistor T1. The second period t2 may be a compensation period for compensating for the threshold voltage Vth of the first transistor T1.

The initialization interval t1 and the compensation interval t2 within one frame may be repeated twice or more to minimize the influence of the data signal Di during the previous frame in the pixel PXij. The third period t3 may be the same initialization period as the first period t1 at different timings, and the fourth period t4 may be the same compensation period as the second period t2 at different timings.

During the fifth period t5, the scan signal GWj having a low level is provided through the scan line GWLj. The second transistor T2 is turned on in response to the scan signal GWj having the low level, and thus the data signal Di is delivered to the first node N1 through the second transistor T2. When the data signal Di is delivered to the first node N1, the potential of the second node N2 is increased by the capacitor Cst as much as the voltage level of the data signal Di, and a compensation voltage, which is obtained by reducing the voltage of the data signal Di supplied from the data line DLi by the threshold voltage Vth of the first transistor T1, is applied to the gate electrode of the first transistor T1. The third period t3 may be a programming period for storing the data signal Di in the capacitor Cst.

During the sixth interval t6, the seventh transistor T7 is turned on by receiving the scan signal GBj having a low level through the scan line GBLj. As the seventh transistor T7 is turned on, the anode of the light emitting element ED may be initialized to the first initialization voltage VAINT. The sixth period t6 may be an anode-initialization period for initializing the anode of the light emitting element ED. The luminance of the light emitting element ED may be controlled based on a voltage level of the first initialization voltage VAINT, and thus the first initialization voltage VAINT may be a luminance control voltage.

Next, during the emission period EP, the sixth transistor T6 is turned on by the emission signal EMj having a low level. When the sixth transistor T6 is turned on, the driving current corresponding to a voltage difference between the gate voltage of the gate electrode of the first transistor T1 and the first driving voltage ELVDD is generated and supplied to the light emitting element ED through the sixth transistor T6, and thus the light emitting element ED may emit light.

Figure 4A:
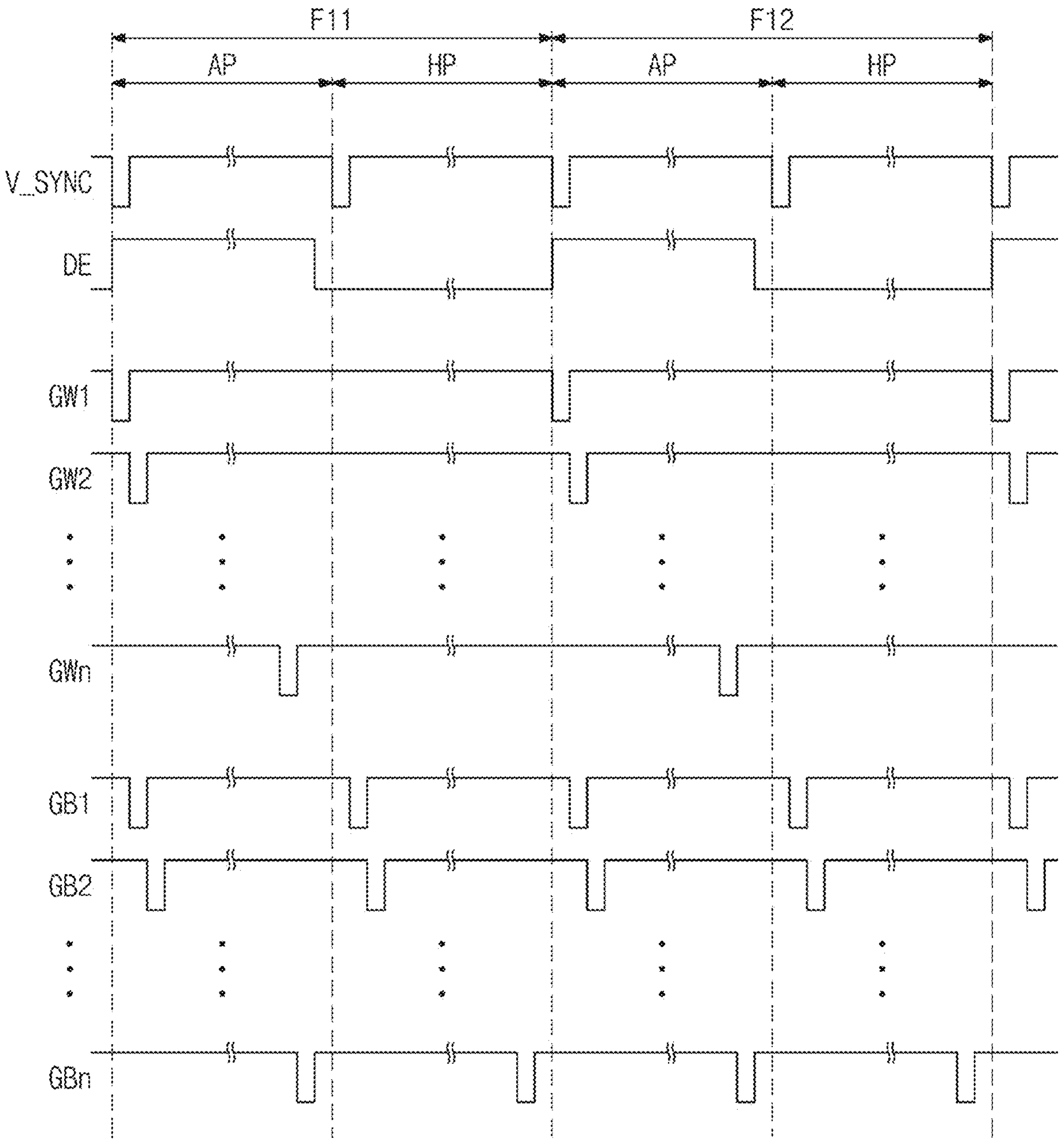
FIGS. 4A and 4B are signal timing diagrams for describing an operation of a display device.
Figure 4B:
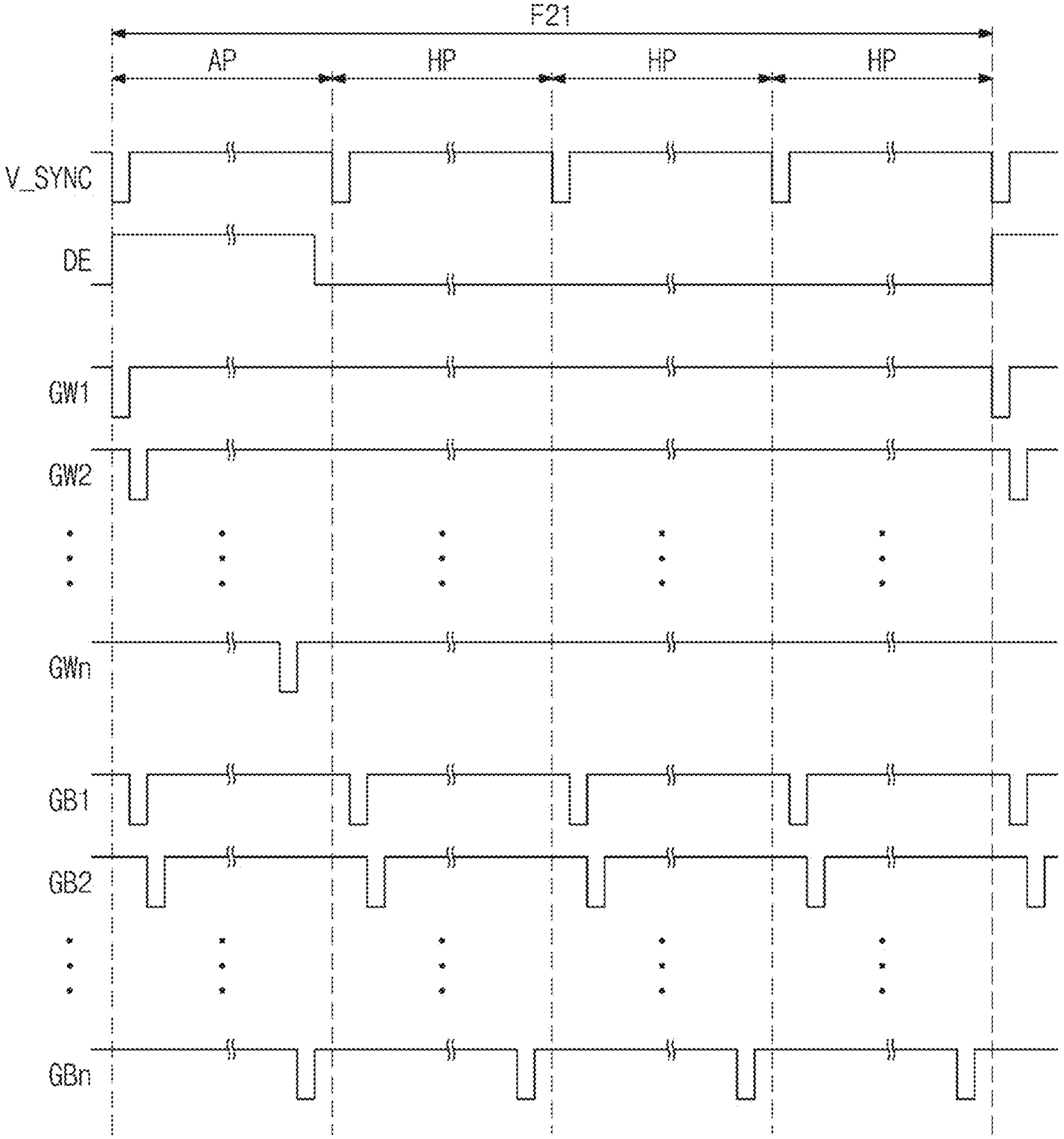

FIGS. 4A and 4B are signal timing diagrams for describing an operation of a display device.

Referring to FIGS. 1, 2, 4A, and 4B, for convenience of description, a case where the display device DD operates at a first frequency (e.g., 240 hertz (Hz)) and a second frequency (e.g., 120 Hz) will be described. However, the disclosure is not limited thereto, and the operating frequency of the display device DD may be changed in various manners. In an embodiment, the operating frequency of the display device DD may be selected as one of the first frequency and the second frequency. In an embodiment, the display device DD may not set the operating frequency to a specific frequency during an operation, but may change the operating frequency at any time. In an embodiment, the operating frequency of the display device DD may be determined depending on a frequency of the input image signal I_RGB and the control signal CTRL.

In an embodiment, the driving controller 100 provides the scan control signal SCS to the scan driving circuit SDC in response to the control signal CTRL. The control signal CTRL may include a synchronization signal V_SYNC. The scan driving circuit SDC may output the scan signals GC1 to GCn, GI1 to GIn, GW1 to GWn, and GB1 to GBn corresponding to the operating frequency in response to the scan control signal SCS.

FIG. 4A is a signal timing diagram of a start signal and scan signals when an operating frequency of the display device DD is a first frequency (e.g., 240 Hz).

Referring to FIGS. 1 and 4A, when an operating frequency is a first frequency (e.g., 240 Hz), each of frames F11 and F12 may include one active period AP and one hold period HP. The synchronization signal V_SYNC may be a signal indicating the start of each of the active period AP and the hold period HP.

The scan driving circuit SDC sequentially activates the scan signals GW1 to GWn in the active period AP of frames F11 and F12 at active levels (e.g., low levels), and sequentially activates the scan signals GB1 to GBn at low levels. FIG. 4A illustrates only the scan signals GW1 to GWn and the scan signals GB1 to GBn. However, the scan signals GI1 to GIn and GC1 to GCn and the emission control signals EM1 to EMn may also be sequentially activated in the active period AP of each of the frames F11 and F12.

During the hold period HP, the scan driving circuit SDC may maintain the scan signals GW1 to GWn at inactive levels (e.g., high levels) and may sequentially activate the scan signals GB1 to GBn.

Although not shown in FIG. 4A, during the hold period HP, the scan driving circuit SDC may maintain scan signals GI1 to Gin and GC1 to GCn at inactive levels (e.g., high levels) in the same way as the scan signals GW1 to GWn. During the hold period HP, the emission driving circuit EDC may sequentially activate the emission control signals EM1 to EMn.

A data enable signal DE may be at a high level during the active period AP, and thus the valid input image signal I_RGB may be received from the outside. When the scan signal GWj transitions to a low level, the pixel PXij shown in FIG. 2 may receive the data signal Di corresponding to the valid input image signal I_RGB.

During the hold period HP, the data enable signal DE is at a low level, and thus the valid input image signal I_RGB is not received from the outside. During the hold period HP, all the scan signals GW1 to GWn may be maintained at high levels, and thus the pixel PXij may not receive the data signal Di. However, when the sixth transistor T6 is turned on, the light emitting element ED may emit light by charges stored in the capacitor Cst. That is, the pixel PXij may emit light not only in the active period AP but also in the hold period HP.

FIG. 4B is a signal timing diagram of a start signal and scan signals when an operating frequency of the display device DD is a second frequency (e.g., 120 Hz).

Referring to FIGS. 1 and 4B, when an operating frequency is a second frequency (e.g., 120 Hz), a period (or duration) of a frame F21 may be twice a period of each of the frames F11 and F12 shown in FIG. 4A. The frame F21 may include one active period AP and three hold periods HP. During the active period AP, the scan driving circuit SDC sequentially activates the scan signals GW1 to GWn at low levels, and sequentially activates the scan signals GB1 to GBn at low levels. FIG. 4B illustrates only the scan signals GW1 to GWn and the scan signals GB1 to GBn. However, the scan signals GI1 to GIn and GC1 to GCn and the emission control signals EM1 to EMn may also be sequentially activated in the active period AP of the frame F21.

During the hold period HP, the scan driving circuit SDC may maintain the scan signals GW1 to GWn at inactive levels (e.g., high levels) and may sequentially activate the scan signals GB1 to GBn.

Although not illustrated in FIG. 4B, the scan driving circuit SDC may maintain the scan signals GI1 to Gin and GC1 to GCn at inactive levels (e.g., high levels) during the hold cycle HC. During the hold period HP, the emission driving circuit EDC may sequentially activate the emission control signals EM1 to EMn.

As shown in FIGS. 4A and 4B, the data enable signal DE included in the control signal CTRL may transition to an active level (e.g., a high level) in the active period AP in each of the frames F11, F12, and F21, and may be maintained at an inactive level (e.g., a low level) in the hold period HP.

Figure 5A:
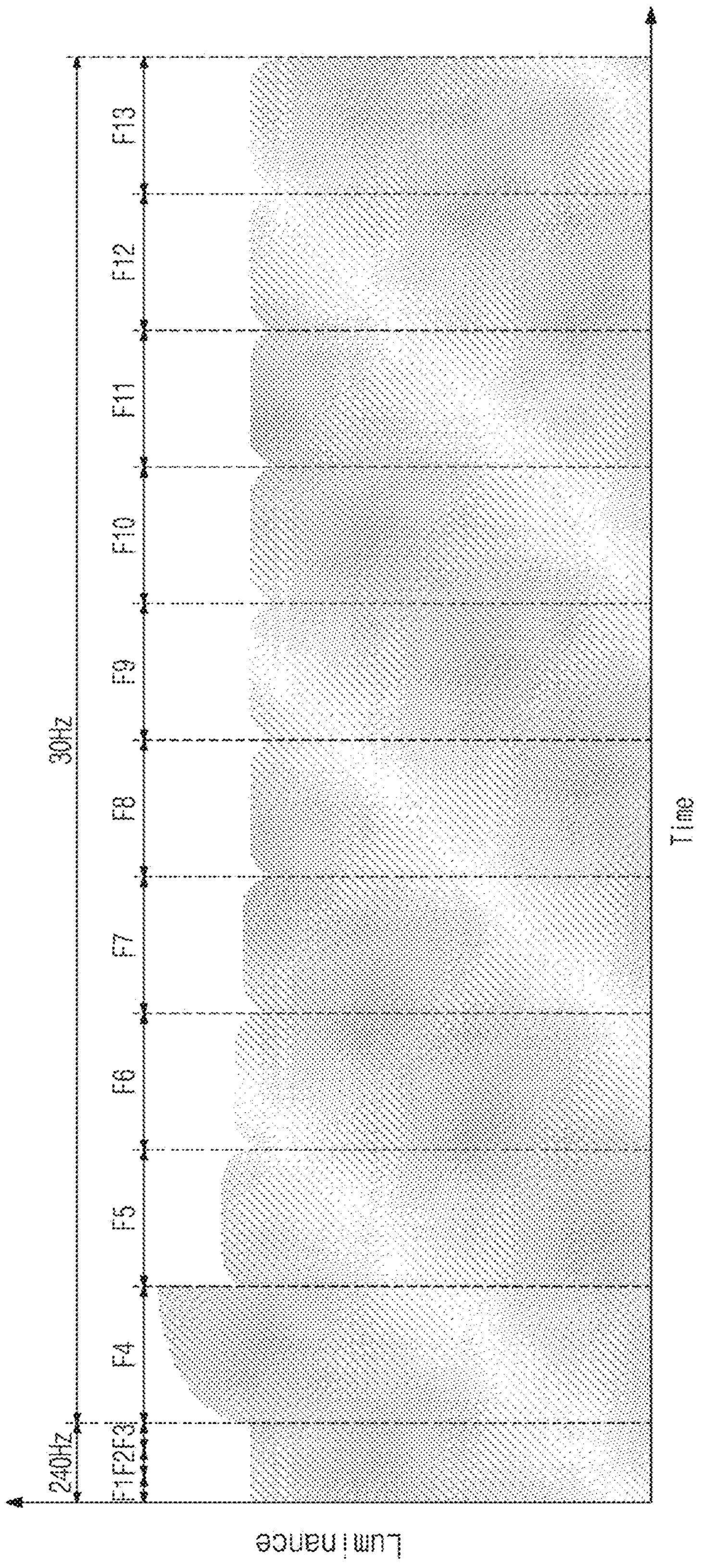
FIG. 5A is a diagram illustrating a change in luminance of an image according to an operating frequency of a display device.

FIG. 5A is a diagram illustrating a change in luminance of an image according to an operating frequency of a display device.

Figure 5B:
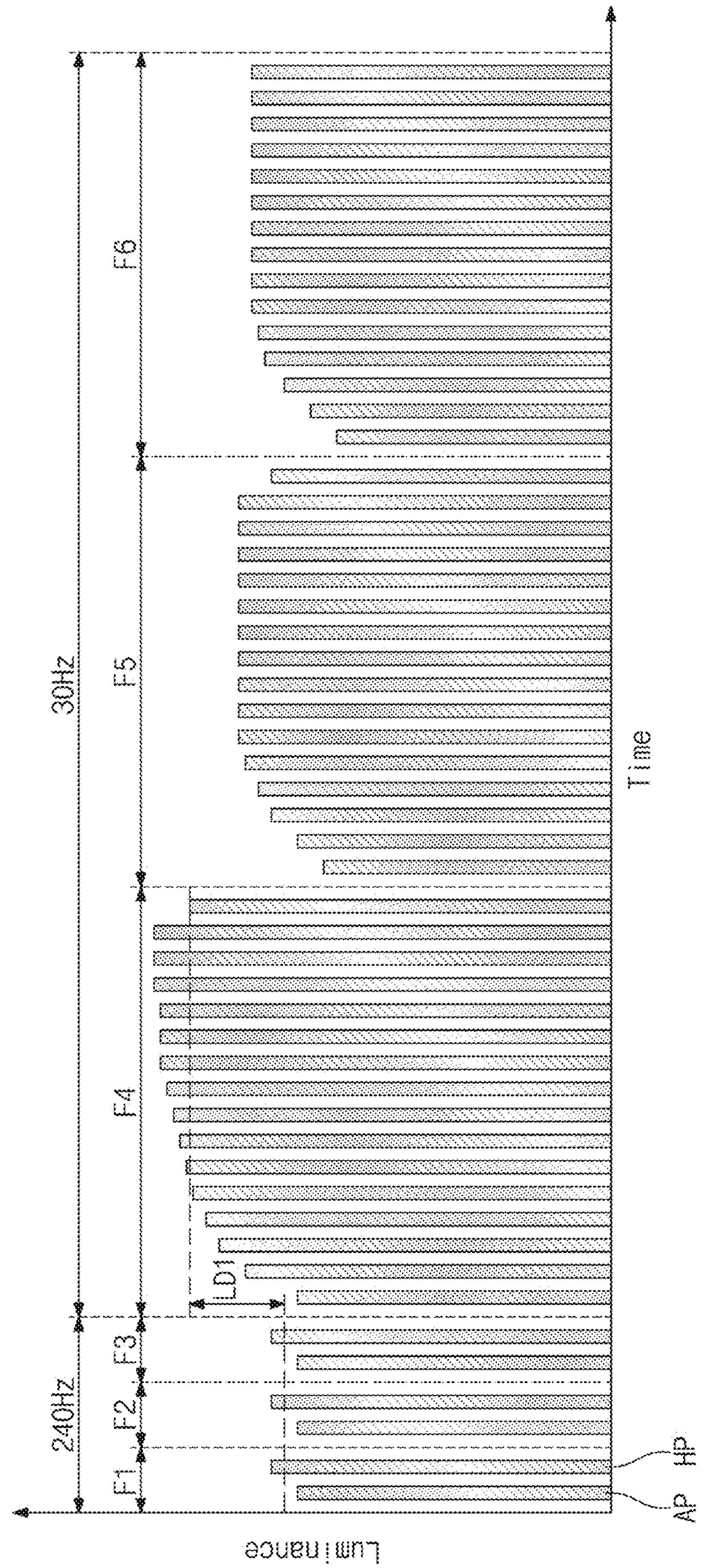
FIG. 5B is a diagram illustrating a change in luminance of an image in an active period and a hold period of some frames shown in FIG. 5A.

FIG. 5B is a diagram illustrating a change in luminance of an image in an active period and a hold period of some frames shown in FIG. 5A.

Referring to FIGS. 1, 5A, and 5B, in first to third frames F1, F2, and F3, an operating frequency of the display device DD is a first operating frequency (e.g., 240 Hz). In fourth to thirteenth frames F4 to F13, the operating frequency of the display device DD is a second operating frequency (e.g., 30 Hz).

As shown in FIGS. 5A and 5B, the luminance of the image displayed on the display panel DP in the fourth frame F4 may be increased even though the driving controller 100 outputs the output image signal O_RGB having a same gray level when the operating frequency of the display device DD is changed from 240 Hz to 30 Hz. This is due to hysteresis characteristics of the first transistor T1 (see FIG. 2) in the pixels PX.

When the operating frequency is changed from the first operating frequency to the second operating frequency (i.e., the third frame F3 and the fourth frame F4), a luminance deviation LD1 may be perceived by a user as flicker. The luminance deviation LD1 may be a difference value between the average luminance in the third frame F3 and the average luminance in the fourth frame F4.

The luminance deviation LD1 is related to the duration of the first operating frequency and a difference value between the first operating frequency, which is a previous operating frequency, and the second operating frequency, which is a current operating frequency. That is, as the difference value between the previous operating frequency and the current operating frequency increases and the duration of the previous operating frequency, i.e., the first operating frequency, increases, the luminance deviation LD1 increases.

Figure 6:
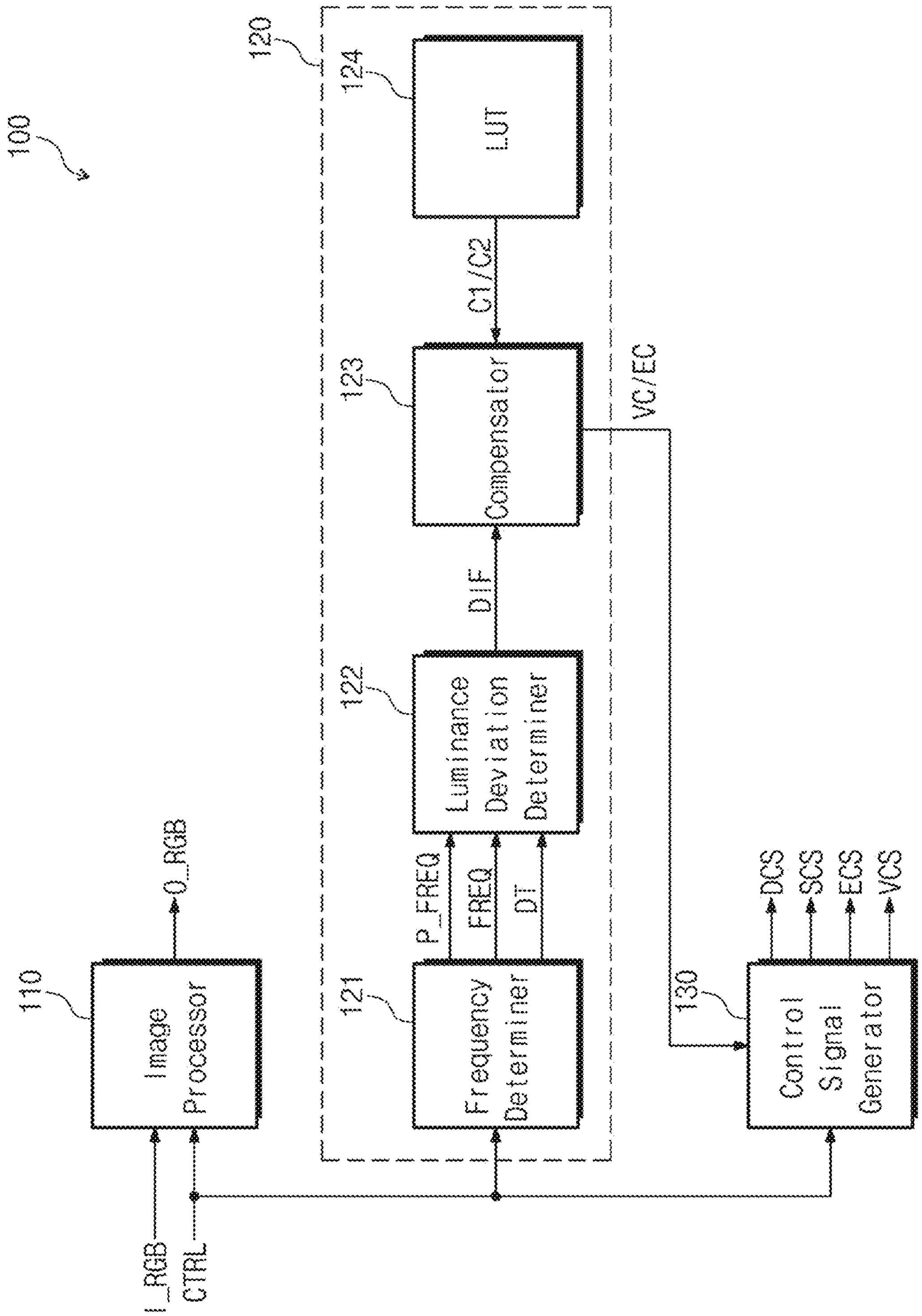
FIG. 6 is a block diagram of a driving controller, according to an embodiment of the disclosure.

FIG. 6 is a block diagram of the driving controller 100, according to an embodiment of the disclosure.

Referring to FIG. 6, an embodiment of the driving controller 100 may include an image processor 110, a luminance compensator 120, and a control signal generator 130.

The image processor 110 receives the input image signal I_RGB and the control signal CTRL, and outputs the output image signal O_RGB.

The luminance compensator 120 determines a current operating frequency based on a control signal. When the current operating frequency is different from a previous operating frequency, the luminance compensator 120 outputs a voltage compensation signal VC based on a difference value between the current operating frequency and the previous operating frequency and the operating time of the previous operating frequency (or a duration of operation in the previous operating frequency). In an embodiment, the luminance compensator 120 includes a frequency determiner 121, a luminance deviation determiner 122, a compensator 123, and a lookup table (LUT in FIG. 6) 124.

The frequency determiner 121 determines the operating frequency (i.e., the current operating frequency) of the current frame based on the control signal CTRL. The frequency determiner 121 may determine the current operating frequency based on the control signal CTRL. As shown in FIGS. 4A and 4B, the control signal CTRL includes the synchronization signal V_SYNC and the data enable signal DE. In an embodiment, the synchronization signal V_SYNC may be activated at a low level only in the active period AP within one frame. In this case, the frequency determiner 121 may determine the current operating frequency by determining the period of the synchronization signal V_SYNC.

In an embodiment, as shown in FIGS. 4A and 4B, at the start of the active period AP or the respective hold periods HP within one frame, the synchronization signal V_SYNC may be activated at a low level. In an embodiment, as shown in FIGS. 4A and 4B, the data enable signal DE may be activated at a high level in the active period AP. While the data enable signal DE is at a high level, the valid input image signal I_RGB may be received from the outside.

When the synchronization signal V_SYNC is activated at a low level, the frequency determiner 121 may determine the current operating frequency by counting the number of times that the data enable signal DE is maintained at a low level. In an embodiment, for example, as illustrated in FIG. 4A, in a case where the number of times that the data enable signal DE is maintained at low level is 1 when the synchronization signal V_SYNC is activated at a low level, the current operating frequency may be 240 Hz. In an embodiment, for example, as illustrated in FIG. 4B, in a case where the number of times that the data enable signal DE is continuously maintained at low level is 3 when the synchronization signal V_SYNC is activated at a low level, the current operating frequency may be 120 Hz.

A method of determining the current operating frequency based on the control signal CTRL by the frequency determiner 121 is not limited to the above-described examples, and the method may be variously changed.

When a current operating frequency FREQ is the same as an operating frequency of the previous frame (i.e., a previous operating frequency P_FREQ), the frequency determiner 121 counts an operating time DT. In an embodiment, for example, when the current operating frequency FREQ is the same as the previous operating frequency P_FREQ, the frequency determiner 121 may increase a count value for every frame. When the current operating frequency FREQ is different from the previous operating frequency P_FREQ, the frequency determiner 121 may output the accumulated count value as the operating time DT. The operating time may correspond to the number of frames (i.e., a cumulative time) in each of which the current operating frequency FREQ is the same as the previous operating frequency P_FREQ. The frequency determiner 121 may include a memory (or buffer) for temporarily storing the previous operating frequency P_FREQ and the operating time DT.

When the current operating frequency FREQ is different from the previous operating frequency P_FREQ, the frequency determiner 121 may provide the luminance deviation determiner 122 with the previous operating frequency P_FREQ, the current operating frequency FREQ, and the operating time DT. The operating time DT may be a retention time (the number of frames) of the previous operating frequency P_FREQ. In an embodiment, when the current operating frequency FREQ is lower than the previous operating frequency P_FREQ, the frequency determiner 121 may provide the luminance deviation determiner 122 with the previous operating frequency P_FREQ, the current operating frequency FREQ, and the operating time DT.

The luminance deviation determiner 122 calculates a luminance deviation DIF based on a difference value between the current operating frequency FREQ and the previous operating frequency P_FREQ (will be referred to as "difference value DF") and the operating time DT. In an embodiment, the luminance deviation determiner 122 may calculate the luminance deviation DIF through an arithmetic operation of the difference value DF between the current operating frequency FREQ and the previous operating frequency P_FREQ and the operating time DT. In an embodiment, the luminance deviation determiner 122 may calculate the luminance deviation DIF through a multiplication operation "DF×DT" of the difference value DF between the current operating frequency FREQ and the previous operating frequency P_FREQ and the operating time DT. The method of calculating the luminance deviation DIF based on the difference value DF between the current operating frequency FREQ and the previous operating frequency P_FREQ and the operating time DT may be changed in various ways.

When the luminance deviation DIF is greater than a reference value (referred to as 'k') (i.e., DIF>k), the luminance deviation determiner 122 may provide the luminance deviation DIF to the compensator 123.

The compensator 123 may receive a first compensation value C1 and a second compensation value C2 from the lookup table 124 based on the luminance deviation DIF from the luminance deviation determiner 122.

In an embodiment, the compensator 123 may receive both the first compensation value C1 and the second compensation value C2 corresponding to the luminance deviation DIF, or may receive either the first compensation value C1 or the second compensation value C2. The first compensation value C1 and the second compensation value C2 may be compensation values for changing an operating environment of the display device DD. In an embodiment, the first compensation value C1 may be a compensation value for adjusting a voltage level of the first initialization voltage VAINT. In an embodiment, the second compensation value C2 may be a compensation value for adjusting pulse widths of the emission signals EM1 to EMn.

The compensator 123 may output the voltage compensation signal VC based on the first compensation value C1, and may output an emission compensation signal EC based on the second compensation value C2.

The control signal generator 130 outputs the data control signal DCS, the scan control signal SCS, the emission control signal ECS, and the voltage control signal VCS in response to the control signal CTRL.

In an embodiment, the control signal generator 130 may output the voltage control signal VCS for adjusting the voltage level of the first initialization voltage VAINT in response to the voltage compensation signal VC from the compensator 123. In an embodiment, the control signal generator 130 may output the emission control signal ECS for adjusting pulse widths of the emission signals EM1 to EMn in response to the emission compensation signal EC from the compensator 123.

FIG. 7 is a diagram illustrating the first compensation value C1 and the second compensation value C2 stored in the lookup table 124 shown in FIG. 6.

Referring to FIGS. 6 and 7, in an embodiment, the lookup table 124 may store the first compensation value C1 and the second compensation value C2 that correspond to the luminance deviation DIF. In an embodiment, the first compensation value C1 may be a compensation value for adjusting a voltage level of the first initialization voltage VAINT.

In an embodiment, the luminance deviation DIF may be a product (DF×DT) of the difference value DF between the current operating frequency FREQ and the previous operating frequency P_FREQ, and the operating time DT. That is, as the difference value DF between the current operating frequency FREQ and the previous operating frequency P_FREQ increases, and the operating time DT increases, the luminance deviation DIF has a greater value. In an embodiment, for example, when the luminance deviation DIF is 1000, the first compensation value C1 may be 2 volts (V). When the luminance deviation DIF is 450, the first compensation value C1 may be 0.9 V. That is, as the luminance deviation DIF increases, the first compensation value C1 increases.

As described above with reference to FIGS. 5A and 5B, when the operating frequency of the display device DD is changed from the first operating frequency (240 Hz) to the second operating frequency (30 Hz), the luminance of the display panel DP is increased. Accordingly, when the operating frequency is changed from the first operating frequency (240 Hz) to the second operating frequency (30 Hz), compensation is desired to lower the luminance.

Returning to FIG. 2, the first initialization voltage VAINT is a voltage for initializing the anode of the light emitting element ED. As a voltage level of the first initialization voltage VAINT decreases a longer time is spent to increase to the desired luminance even when a same current flows to the light emitting element ED. That is, when the operating frequency is changed from the first operating frequency (240 Hz) to the second operating frequency (30 Hz), the luminance increase of the display panel DP may be effectively prevented by reducing a voltage level of the first initialization voltage VAINT.

The compensator 123 may output the voltage compensation signal VC such that the first initialization voltage VAINT is reduced to a voltage level corresponding to the first compensation value C1. In an embodiment, when the maximum operating frequency of the display device DD is 240 Hz, a voltage level of the first initialization voltage VAINT may be a first voltage level V1. The compensator 123 may output the voltage compensation signal VC corresponding to a difference (V1−C1) between the first voltage level V1 and the first compensation value C1.

Returning to FIG. 7, for example, when the luminance deviation DIF is 1000, the second compensation value C2 may be twenty horizontal periods 20H. When the luminance deviation DIF is 450, the second compensation value C2 may be nine horizontal periods 9H. That is, as the luminance deviation DIF increases, the second compensation value C2 increases. The horizontal period H may be a time period during which the pixels PX in one row of the display panel DP are driven.

Figure 8:
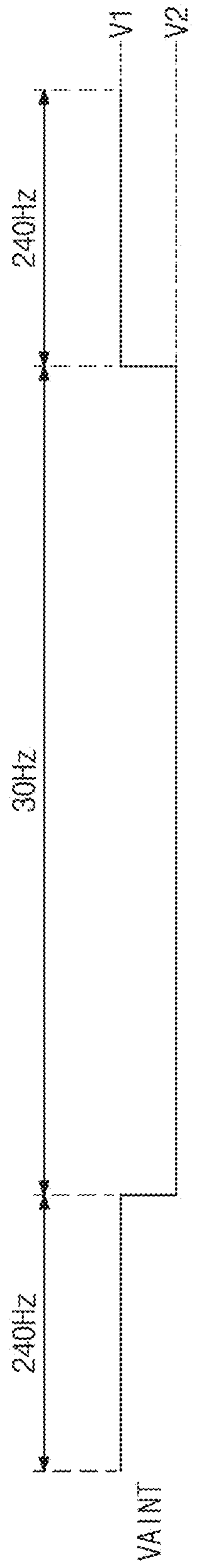
FIG. 8 illustrates a voltage level of a first initialization voltage according to an operating frequency.

FIG. 8 illustrates a voltage level of the first initialization voltage VAINT according to an operating frequency.

Referring to FIGS. 6 and 8, the control signal generator 130 outputs the voltage control signal VCS in response to the voltage compensation signal VC. The voltage generator 300 shown in FIG. 1 generates the first initialization voltage VAINT in response to the voltage control signal VCS.

In an embodiment, when the operating frequency of the display device DD is a first operating frequency (240 Hz), a voltage level of the first initialization voltage VAINT may be the first voltage level V1. When the operating frequency of the display device DD is a second operating frequency (30 Hz), the voltage level of the first initialization voltage VAINT may be a second voltage level V2. The second voltage level V2 is lower than the first voltage level V1.

The second voltage level V2 may be determined depending on the difference value DF between the first operating frequency (240 Hz) and the second operating frequency (30 Hz) and a time period during which the first operating frequency (240 Hz) is maintained, that is, the operating time DT.

Figure 9:
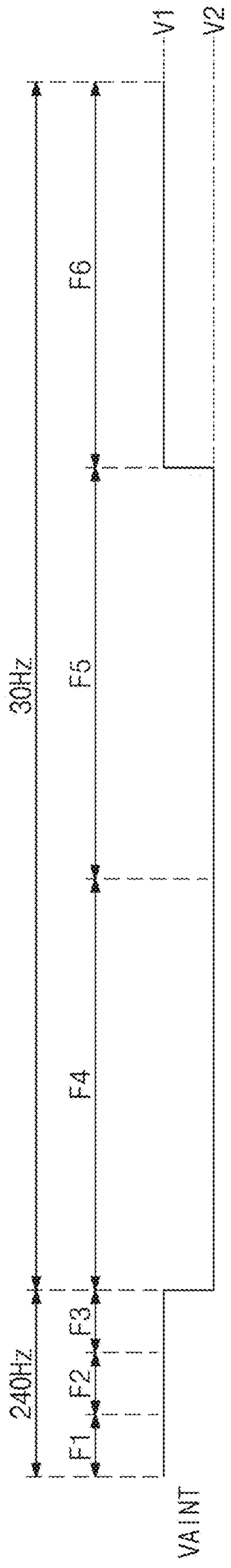
FIG. 9 illustrates a voltage level of a first initialization voltage according to an operating frequency.

FIG. 9 illustrates a voltage level of the first initialization voltage VAINT according to an operating frequency.

Referring to FIGS. 6 and 9, during the first to third frames F1, F2, and F3, in each of which an operating frequency of the display device DD is a first operating frequency (240 Hz), a voltage level of the first initialization voltage VAINT is the first voltage level V1. When an operating frequency of the display device DD is changed from the first operating frequency (240 Hz) to the second operating frequency (30 Hz), the voltage level of the first initialization voltage VAINT may be the second voltage level V2 during a predetermined time. For example, in two frames (i.e., the fourth and fifth frames F4 and F5) after the operating frequency of the display device DD is changed from the first operating frequency (240 Hz) to the second operating frequency (30 Hz), a voltage level of the first initialization voltage VAINT may be the second voltage level V2.

As described above with reference to the fourth and fifth frames F4 and F5 in FIG. 9, even when the operating frequency of the display device DD is maintained at the second operating frequency (30 Hz) in the sixth frame F6, the voltage level of the first initialization voltage VAINT returns to the first voltage level V1.

As shown in FIGS. 5A and 5B, when the operating frequency of the display device DD is changed from the first operating frequency (240 Hz) to the second operating frequency (30 Hz), the luminance of the display panel DP increases during a specific period. Accordingly, the voltage level of the first initialization voltage VAINT may be changed to the second voltage level V2 only in the fourth and fifth frames F4 and F5 within one frame. In the sixth frame F6, the voltage level of the first initialization voltage VAINT may be returned to the first voltage level V1.

Figure 10:
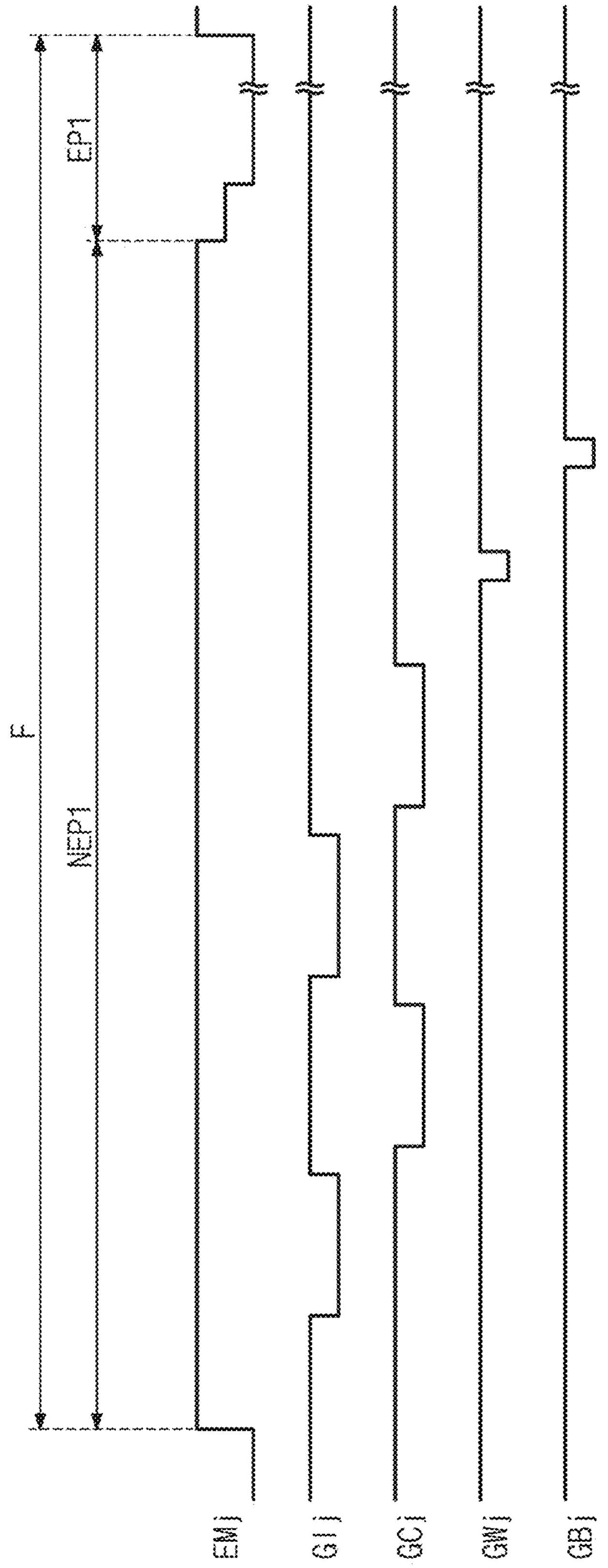
FIG. 10 is a signal timing diagram for describing an operation of a pixel illustrated in FIG. 2.

FIG. 10 is a signal timing diagram for describing an operation of a pixel illustrated in FIG. 2.

Referring to FIGS. 6 and 10, the control signal generator 130 outputs the emission control signal ECS in response to the emission compensation signal EC. The emission driving circuit EDC shown in FIG. 1 generates the emission signals EM1 to EMn in response to the emission control signal ECS.

Referring to FIGS. 2 and 10, one frame F may include an emission period EP1 and a non-emission period NEP1 in which the light emitting element ED does not emit light. During the non-emission period NEP1 in which the emission signal EMj is at a high level, the light emitting element ED does not emit light. As the sixth transistor T6 is turned on during the emission period EP1, in which the emission signal EMj is at a low level, and then a driving current is provided to the light emitting element ED, the light emitting element ED may emit light.

When an operating frequency of the display device DD is lowered from the first operating frequency to the second operating frequency, the non-emission period NEP1 in the one frame F may be lengthened (or a duration thereof may be increased), and the emission period EP1 may be shortened (or a duration thereof may be decreased).

The non-emission period NEP1 shown in FIG. 10 is longer than the non-emission period NEP shown in FIG. 3. Moreover, the emission period EP1 shown in FIG. 10 is shorter than the emission period EP shown in FIG. 3.

For example, as shown in FIG. 7, when the luminance deviation DIF is 1000, the second compensation value C2 is 20 horizontal periods 20H. That is, the non-emission period NEP1 in the one frame F may increase by 20 horizontal periods and the emission period EP1 may decrease by 20 horizontal periods 20H. In an embodiment, one horizontal period 1H may be a time period during which the scan signal GWj is maintained at an active level (e.g., a low level).

As the emission period EP1 is shortened, the emission time of the light emitting element ED is shortened. As a result, the luminance of the display panel DP may be lowered.

As shown in FIGS. 5A and 5B, when the operating frequency of the display device DD is changed from the first operating frequency (240 Hz) to the second operating frequency (30 Hz), the luminance of the display panel DP increases. The luminance of the display panel DP may be effectively prevented from increasing by reducing the emission time of the light emitting element ED.

Figure 11:
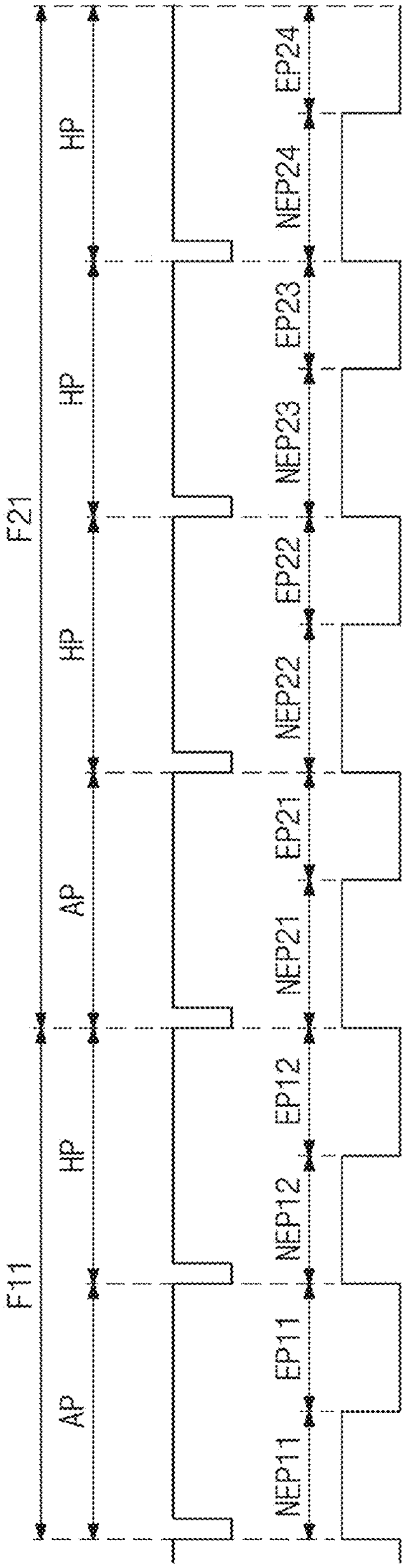
FIG. 11 illustrates a non-emission period and an emission period according to an operating frequency.

FIG. 11 illustrates a non-emission period and an emission period according to an operating frequency.

Referring to FIGS. 6 and 11, in an embodiment, the frame F11 in which an operating frequency of the display device DD is a first operating frequency (240 Hz) includes non-emission periods NEP11 and NEP12 and emission periods EP11 and EP12.

The frame F21 in which the operating frequency of the display device DD is the second operating frequency (30 Hz) includes non-emission periods NEP21, NEP22, NEP23, and NEP24 and emission periods EP21, EP22, EP23, and EP24.

In an embodiment, a retention time of each of the non-emission periods NEP21, NEP22, NEP23, and NEP24 of the frame F21 is longer than a retention time of each of the non-emission periods NEP11 and NEP12 of the frame F11. Moreover, a retention time (first time) of each of the emission periods EP21, EP22, EP23, and EP24 of the frame F21 is shorter than a retention time (second time) of each of the emission periods EP11 and EP12 of the frame F11.

As the emission period of the light emitting element ED is reduced from the first time to the second time when the operating frequency of the display device DD is changed from the first operating frequency (240 Hz) to the second operating frequency (30 Hz), the luminance of the display panel DP may be effectively prevented from increasing.

As described above with reference to FIG. 9, in an embodiment, when the operating frequency of the display device DD is changed from the first operating frequency (240 Hz) to the second operating frequency (30 Hz), the voltage level of the first initialization voltage VAINT in the fourth and fifth frames F4 and F5 may be the second voltage level V2, and the voltage level of the first initialization voltage VAINT in the sixth frame F6 may return to the first voltage level V1.

In such an embodiment, when the operating frequency of the display device DD is changed from the first operating frequency (240 Hz) to the second operating frequency (30 Hz), the emission time of the light emitting element ED may be reduced in the fourth and fifth frames F4 and F5, and the emission time of the light emitting element ED may be returned to be the same as that of the first to third frames F1, F2, and F3 in the sixth frame F6.

Figure 12:
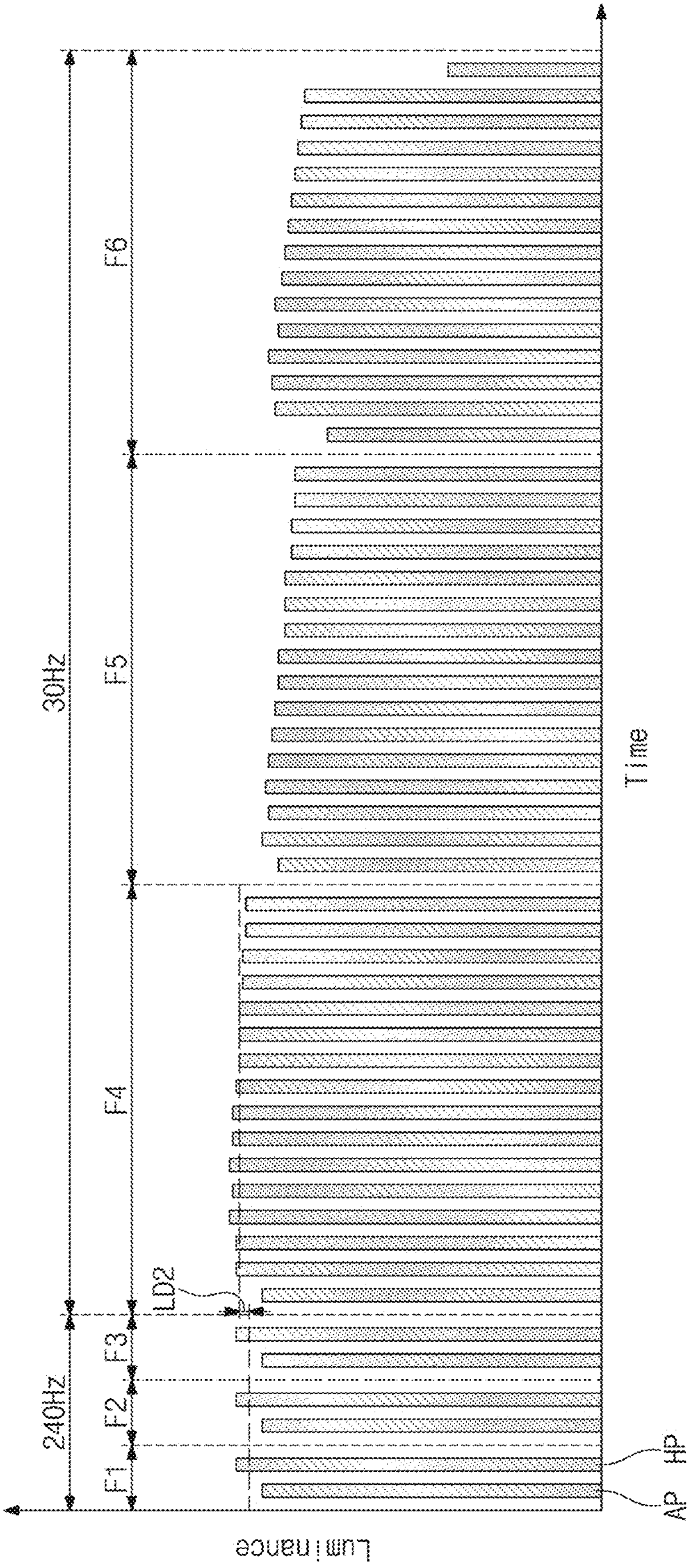
FIG. 12 is a diagram illustrating a change in luminance of an image according to an operating frequency of a display device.

FIG. 12 is a diagram illustrating a change in luminance of an image according to an operating frequency of a display device.

Referring to FIGS. 1 and 12, in the first to third frames F1, F2, and F3, the operating frequency of the display device DD is a first operating frequency (e.g., 240 Hz). In the fourth to sixth frames F4, F5, and F6, the operating frequency of the display device DD is a second operating frequency (e.g., 30 Hz).

The luminance of the image displayed on the display panel DP in the fourth frame F4 may be temporarily increased even though the driving controller 100 outputs the output image signal O_RGB having a same gray level when the operating frequency of the display device DD is changed from 240 Hz to 30 Hz.

As described in FIGS. 6 to 11, compared to the luminance deviation LD1 shown in FIG. 5B, a luminance deviation LD2 in the third frame F3 and the fourth frame F4 may be reduced by a compensation operation of changing the voltage level of the first initialization voltage VAINT and/or pulse widths of the emission signals EM1 to EMn. Accordingly, during a variable frequency mode in which the operating frequency of the display device DD is changed, display quality may be effectively prevented from degrading due to a change in luminance of the display panel DP.

Figure 13:
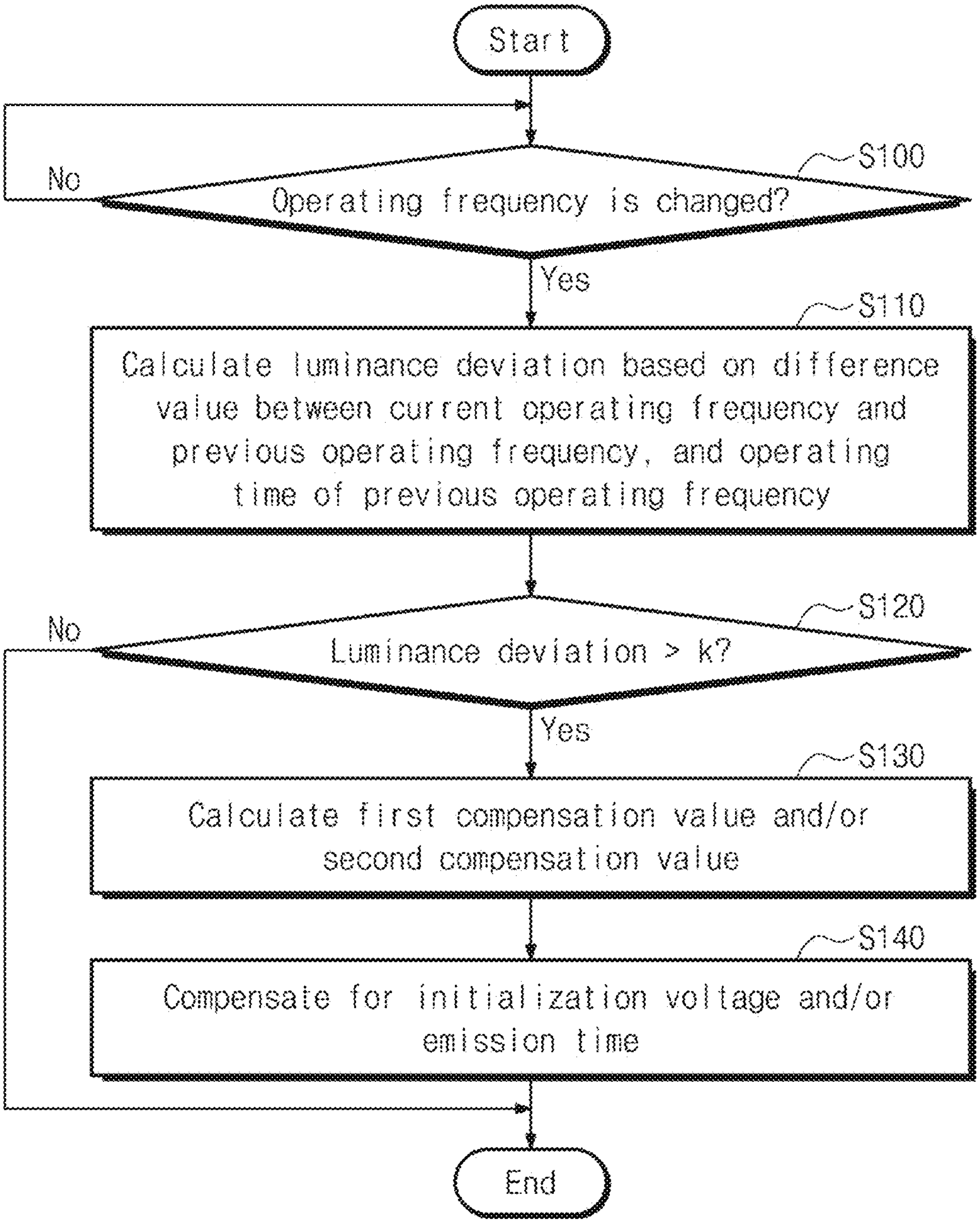
FIG. 13 is a flowchart illustrating a method of driving a display device, according to an embodiment of the disclosure.

FIG. 13 is a flowchart illustrating a method of driving a display device, according to an embodiment of the disclosure.

For convenience of description, an embodiment of a method of driving a display device will be described with reference to the display device of FIG. 1 and the driving controller 100 of FIG. 6, but the disclosure is not limited thereto.

Referring to FIGS. 1, 6, and 13, the frequency determiner 121 determines the current operating frequency FREQ of the input image signal I_RGB based on the control signal CTRL. When the current operating frequency FREQ is different from the previous operating frequency P_FREQ, it may be determined that an operating frequency is changed (S100).

When the operating frequency is changed, the frequency determiner 121 provides the luminance deviation determiner 122 with the previous operating frequency P_FREQ, the current operating frequency FREQ, and the operating time DT of the previous operating frequency P_FREQ.

The luminance deviation determiner 122 calculates the luminance deviation DIF based on the previous operating frequency P_FREQ, the current operating frequency FREQ, and the operating time DT (S110).

When the luminance deviation DIF is greater than the reference value k (i.e., DIF>k) (S120: Yes), the luminance deviation determiner 122 may provide the luminance deviation DIF to the compensator 123.

The compensator 123 calculates the first compensation value C1 and the second compensation value C2 based on the luminance deviation DIF from the luminance deviation determiner 122 (S130). In an embodiment, the compensator 123 may receive the first compensation value C1 and the second compensation value C2 from the lookup table 124 based on the luminance deviation DIF.

The compensator 123 may output the voltage compensation signal VC based on the first compensation value C1, and may output the emission compensation signal EC based on the second compensation value C2.

The control signal generator 130 may output the voltage control signal VCS for adjusting a voltage level of an initialization voltage (i.e., the first initialization voltage VAINT) in response to a voltage compensation signal VC from the compensator 123. In an embodiment, the control signal generator 130 may output the emission control signal ECS for adjusting pulse widths of the emission signals EM1 to EMn in response to the emission compensation signal EC from the compensator 123.

Accordingly, the voltage level of the first initialization voltage VAINT and the emission time of the light emitting element ED may be compensated based on the first compensation value C1 and the second compensation value C2 (S140).

In embodiments of the invention, as described herein, when an operating frequency is changed, a display device may change an operating environment in consideration of a difference between a previous operating frequency and a current operating frequency, and an operating time of the previous operating frequency. Accordingly, the display device may uniformly maintain the amount of light of a light emitting device even when the operating frequency is changed, thereby effectively preventing a change in luminance due to a change in frequency of an input image signal.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a pixel which receives a luminance control voltage;

a driving controller which receives an input image signal and a control signal and provides an output image signal to the display panel; and a voltage generator which generates the luminance control voltage in response to a voltage control signal from the driving controller, wherein the driving controller determines a current operating frequency based on the control signal, and outputs the voltage control signal based on a difference value between the current operating frequency and a previous operating frequency and an operating time of the previous operating frequency, when the current operating frequency is different from the previous operating frequency, wherein the operating time of the previous operating frequency corresponds to a number of consecutive frames in which the display device operates in the previous operating frequency, and wherein the luminance control voltage is changed from a first voltage level to a second voltage level based on the voltage control signal.

2. The display device of claim 1, wherein the driving controller includes:

a luminance compensator which outputs a voltage compensation signal based on the difference value between the current operating frequency and the previous operating frequency and the operating time of the previous operating frequency when the current operating frequency is different from the previous operating frequency; and a control signal generator which receives the voltage compensation signal from the luminance compensator and outputs the voltage control signal in response to the control signal and the voltage compensation signal.

3. The display device of claim 2, wherein the luminance compensator includes:

a frequency determiner which determines the current operating frequency based on the control signal and outputs the current operating frequency, the previous operating frequency, and the operating time when the current operating frequency is different from the previous operating frequency;

a luminance deviation determiner which calculates a luminance deviation based on the current operating frequency, the previous operating frequency, and the operating time and outputs the luminance deviation when the luminance deviation is greater than a reference value; and a compensator which receives the luminance deviation from the luminance deviation determiner, calculates a first compensation value corresponding to the luminance deviation and outputs the voltage compensation signal corresponding to the first compensation value.

4. The display device of claim 3, wherein, when the current operating frequency is lower than the previous operating frequency, the frequency determiner outputs the current operating frequency, the previous operating frequency, and the operating time.

5. The display device of claim 3, wherein the luminance deviation is calculated by an arithmetic operation of the difference value between the current operating frequency and the previous operating frequency and the operating time.

6. The display device of claim 3, wherein the frequency determiner accumulates a time during which the current operating frequency is identical to the previous operating frequency, and outputs an accumulated time as the operating time when the current operating frequency is different from the previous operating frequency.

7. The display device of claim 3, wherein, when the current operating frequency is lower than the previous operating frequency, the second voltage level of the luminance control voltage is lower than the first voltage level.

8. The display device of claim 1, further comprising:

a data driver which provides the pixel with a data signal corresponding to the output image signal, wherein the pixel includes:

a light emitting element including an anode; and a pixel circuit electrically connected to the anode of the light emitting element, and wherein the pixel circuit delivers one of a driving current corresponding to the data signal and the luminance control voltage to the anode of the light emitting element.

9. The display device of claim 8, wherein the pixel circuit includes:

a first transistor including a first electrode connected to a first driving voltage line and a second electrode; and a second transistor which electrically connects the second electrode of the first transistor to the anode of the light emitting element in response to an emission signal.

10. The display device of claim 9, further comprising:

an emission driving circuit which outputs the emission signal in response to an emission control signal from the driving controller, wherein, when the current operating frequency is different from the previous operating frequency, the driving controller outputs the emission control signal based on the difference value between the current operating frequency and the previous operating frequency and the operating time, and wherein an emission period of the emission signal is changed from a first time to a second time based on the emission control signal.

11. The display device of claim 10, wherein, when the current operating frequency is lower than the previous operating frequency, the second time is shorter than the first time.

12. A display device comprising:

a display panel including a pixel which operates in response to an emission signal;

a driving controller which receives an input image signal and a control signal and provides an output image signal to the display panel; and an emission driving circuit which outputs the emission signal in response to an emission control signal from the driving controller, wherein the driving controller determines a current operating frequency based on the control signal, and outputs the emission control signal based on a difference value between the current operating frequency and a previous operating frequency and an operating time of the previous operating frequency, when the current operating frequency is different from the previous operating frequency, wherein the operating time of the previous operating frequency corresponds to a number of consecutive frames in which the display device operates in the previous operating frequency, and wherein an emission period of the emission signal is changed from a first time to a second time based on the emission control signal.

13. The display device of claim 12, wherein the driving controller includes:

a luminance compensator which outputs an emission compensation signal based on the difference value between the current operating frequency and the previous operating frequency and the operating time of the previous operating frequency when the current operating frequency is different from the previous operating frequency; and a control signal generator which receives the emission compensation signal from the luminance compensator and outputs the emission control signal in response to the control signal and the emission compensation signal.

14. The display device of claim 13, wherein the luminance compensator includes:

a frequency determiner which determines the current operating frequency based on the control signal and outputs the current operating frequency, the previous operating frequency, and the operating time when the current operating frequency is different from the previous operating frequency;

a luminance deviation determiner which calculates a luminance deviation based on the current operating frequency, the previous operating frequency, and the operating time and outputs the luminance deviation when the luminance deviation is greater than a reference value; and a compensator which receives the luminance deviation from the luminance deviation determiner, calculates a first compensation value corresponding to the luminance deviation and outputs the emission compensation signal corresponding to the first compensation value.

15. The display device of claim 14, wherein, when the current operating frequency is lower than the previous operating frequency, the second time of the emission period is shorter than the first time.

16. The display device of claim 12, further comprising:

a data driver which provides the pixel with a data signal corresponding to the output image signal, wherein the pixel includes:

a light emitting element including an anode;

a first transistor including a first electrode connected to a first driving voltage line and a second electrode; and a second transistor which electrically connects the second electrode of the first transistor to the anode of the light emitting element during the emission period of the emission signal.

17. The display device of claim 16, further comprising:

a voltage generator which provides a luminance control voltage to the pixel in response to a voltage control signal from the driving controller, wherein the emission signal includes the emission period and a non-emission period, and wherein the pixel further includes:

a third transistor which provides the luminance control voltage to the anode of the light emitting element during an initialization period of the non-emission period.

18. A driving method of a display device, the method comprising:

determining a current operating frequency based on a control signal and determining whether the current operating frequency is different from a previous operating frequency;

when the current operating frequency is different from the previous operating frequency, changing a voltage level of a luminance control voltage from a first voltage level to a second voltage level based on a difference value between the current operating frequency and the previous operating frequency and an operating time of the previous operating frequency, wherein the operating time of the previous operating frequency corresponds to a number of consecutive frames in which the display device operates in the previous operating frequency; and providing the luminance control voltage to a pixel.

19. The method of claim 18, wherein the changing the voltage level of the luminance control voltage from the first voltage level to the second voltage level includes:

calculating a luminance deviation based on the difference value between the current operating frequency and the previous operating frequency and the operating time of the previous operating frequency;

when the luminance deviation is greater than a reference value, calculating a first compensation value;

outputting a voltage compensation signal corresponding to the first compensation value; and generating the luminance control voltage in response to the voltage compensation signal.

20. The method of claim 18, further comprising:

when the current operating frequency is different from the previous operating frequency, outputting an emission control signal based on the difference value and the operating time, wherein an emission period of an emission signal is changed from a first time to a second time based on the emission control signal, wherein the pixel operates in response to the emission control signal.

21. The method of claim 20, wherein the outputting the emission control signal includes:

calculating a luminance deviation based on the difference value and the operating time;

when the luminance deviation is greater than a reference value, calculating a second compensation value;

outputting an emission compensation signal corresponding to the second compensation value; and outputting the emission control signal in response to the emission compensation signal.

22. A driving controller comprising:

a luminance compensator which determines a current operating frequency based on a control signal provided from an outside and outputs a voltage compensation signal based on a difference value between the current operating frequency and a previous operating frequency and an operating time of the previous operating frequency, when the current operating frequency is different from the previous operating frequency, wherein the operating time of the previous operating frequency corresponds to a number of consecutive frames in which a display device operates in the previous operating frequency; and a control signal generator which receives the voltages compensation signal from the luminance compensator and outputs a voltage control signal in response to the control signal and the voltage compensation signal, wherein a voltage level of a luminance control voltage is changed based on the voltage control signal.

23. The driving controller of claim 22, wherein the luminance compensator includes:

a frequency determiner which determines the current operating frequency based on the control signal and outputs the current operating frequency, the previous operating frequency, and the operating time of the previous operating frequency when the current operating frequency is different from the previous operating frequency;

a luminance deviation determiner which calculates a luminance deviation based on the current operating frequency, the previous operating frequency, and the operating time and outputs the luminance deviation when the luminance deviation is greater than a reference value; and a compensator which receives the luminance deviation from the luminance deviation determiner, calculates a first compensation value corresponding to the luminance deviation and outputs the voltage compensation signal corresponding to the first compensation value.

24. The driving controller of claim 23, wherein the frequency determiner accumulates a time during which the current operating frequency is identical to the previous operating frequency, and outputs an accumulated time as the operating time when the current operating frequency is different from the previous operating frequency.

25. The driving controller of claim 23, wherein, when the current operating frequency is different from the previous operating frequency, the luminance compensator outputs an emission compensation signal based on the difference value between the current operating frequency and the previous operating frequency and the operating time, wherein the control signal generator further outputs an emission control signal in response to the emission compensation signal, and wherein an emission period of an emission signal is changed from a first time to a second time based on the emission control signal.

* * * * *